US008194540B2

(12) United States Patent
Kim et al.

(10) Patent No.: US 8,194,540 B2
(45) Date of Patent: Jun. 5, 2012

(54) APPARATUS AND METHOD FOR MANAGING QUALITY OF SERVICE OF SERVICE FLOW IN WIRELESS COMMUNICATION SYSTEM

(75) Inventors: Ki-Back Kim, Seongnam-si (KR); Sang-Ku Kim, Seoul (KR); Jae-Jeong Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 889 days.

(21) Appl. No.: 12/221,627

(22) Filed: Aug. 5, 2008

(65) Prior Publication Data

US 2009/0040983 A1 Feb. 12, 2009

(30) Foreign Application Priority Data

Aug. 8, 2007 (KR) .................. 10-2007-0079522
May 14, 2008 (KR) .................. 10-2008-0044261

(51) Int. Cl.
*H04J 1/16* (2006.01)
(52) U.S. Cl. .................... 370/230; 370/395.21
(58) Field of Classification Search .......... 370/229, 370/230, 235, 351, 389, 395.1, 395.2, 395.21; 455/403, 422.1, 436, 437, 432.1
See application file for complete search history.

(56) References Cited

U.S. PATENT DOCUMENTS

| 2005/0201324 A1* | 9/2005 | Zheng ............ 370/328 |
| 2006/0268788 A1* | 11/2006 | Harris et al. ............ 370/335 |
| 2007/0248080 A1* | 10/2007 | Nesargi et al. ............ 370/352 |

FOREIGN PATENT DOCUMENTS

| JP | 2004-274368 A | 9/2004 |
| JP | 2007-180889 A | 7/2007 |
| WO | WO 2005/122438 A1 | 12/2005 |
| WO | WO 2006/073297 A1 | 7/2006 |
| WO | WO 2006/093221 A1 | 9/2006 |

OTHER PUBLICATIONS

Office Action dated Apr. 19, 2011 in connection with Japanese Patent Application No. 2008-203304.

* cited by examiner

*Primary Examiner* — Kwang B Yao
*Assistant Examiner* — Obaidul Huq

(57) ABSTRACT

An apparatus and method for managing quality of service (QoS) of a service flow in a wireless communication system are provided. A method of operating a base station (BS) in a wireless communication system includes receiving QoS policy information of mobile stations (MSs) from a network entity including a policy decision function (PDF) or from neighbor BSs, and storing the QoS policy information; detecting a mobile station attempting connection re-establishment; upon detecting the mobile station attempting connection re-establishment, evaluating a QoS policy of the mobile station; and controlling a state of a service flow generated for the mobile station according to the QoS policy.

34 Claims, 8 Drawing Sheets

APPARATUS AND METHOD FOR MANAGING QUALITY OF SERVICE OF SERVICE FLOW IN WIRELESS COMMUNICATION SYSTEM

CROSS-REFERENCE TO RELATED APPLICATION(S) AND CLAIM OF PRIORITY

This application claims priority under 35 U.S.C. §119 (a) to a Korean patent application filed in the Korean Intellectual Property Office on Aug. 8, 2007 and assigned Serial No. 2007-79522, and a Korean patent application filed in the Korean Intellectual Property Office on May 14, 2008 and assigned Serial No. 2008-44261, the entire disclosure of which is herein incorporated by reference.

TECHNICAL FIELD OF THE INVENTION

The present invention relates to an apparatus and method for managing quality of service (QoS) of a service flow (SF) in a wireless communication system and, in particular, to an apparatus and method for managing QoS when a connection is re-established for a previously assigned SF.

Herein, the connection is re-established for the previously assigned SF under a condition, for example, where a mobile station (MS) performs a quick connection setup (QCS), which is called Network reentry in IEEE 802.16, or a hard handover (HHO), or a fast base station switching (FBSS). The FBSS may also be referred to as a soft handover.

BACKGROUND OF THE INVENTION

Recently, there is a growing demand for services having different traffic features, for example, a variety of multimedia application services (e.g., Voice over Internet protocol (VoIP), real-time games, video on demand (VoD), and so forth). With the increase in the types of services and the diversity in the service level requirements of a user, a communication system has been currently operated by considering not only system capability but also quality of service (QoS) representing user satisfaction. Moreover, since available resources vary in a wireless communication system due to a time-variable environment and the mobility of a mobile station (MS), a policy for ensuring the QoS is necessary.

Today, many wireless communication techniques are being proposed to achieve a high-speed mobile communication. Among them, an orthogonal frequency division multiplexing (OFDM) scheme is accepted as one of the most promising next generation wireless communication techniques. The OFDM scheme is expected to be widely used as a future wireless communication technique, and is currently used as a standard in the Institute of Electrical and Electronics Engineers (IEEE) 802.16-based wireless metropolitan area network (WMAN) known as 3.5 Generation (3.5G) technology.

However, a currently available broadband wireless access (BWA) standard defines only an interoperation process of media access control (MAC) layer QoS and does not provide a network interoperation process for ensuring end-to-end QoS which is noticeable to the user. In other words, in an IEEE 802.16-based network in which a physical (PHY)/MAC layer is supported, only a DSx interoperation process between a base station (BS) and an MS is defined, wherein dynamic service addition (DSA) represents service generation, dynamic service deletion (DSD) represents service deletion, and dynamic service change (DSC) represents service change.

End-to-end QoS of an application layer has to be ensured to enhance service quality noticeable to the user. Therefore, when using a BWA system in which only the MAC layer QoS is defined, the interoperation process for QoS setup has to be defined among an MS, an access network, and a core network.

In particular, the current standard does not provide a method for operating a per-flow mode of service flows (SFS), each of which is assigned with a service flow identifier (SFID), and which are managed by an MS performing a reconnection such as a quick connection setup (QCS) or a hard handover (HHO) or a fast base station switching (FBSS). Therefore, when a wireless network is congested, a call (i.e., the connection) may be disconnected according to a result of a connection admission control (CAC). In addition, resources may be wasted due to ineffective management of wireless resources.

SUMMARY OF THE INVENTION

To address the above-discussed deficiencies of the prior art, it is a primary object of the present invention to solve at least the above-mentioned problems and/or disadvantages and to provide at least the advantages described below. Accordingly, an aspect of the present invention is to provide an apparatus and method for managing quality of service (QoS) of a service flow (SF) in a wireless communication system.

Another aspect of the present invention is to provide an apparatus and method for managing QoS when a connection is re-established for a previously assigned SF in a wireless communication system.

Another aspect of the present invention is to provide an apparatus and method for processing a quick connection setup (QCS) according to a QoS policy of a mobile station (MS) in a wireless communication system.

Another aspect of the present invention is to provide an apparatus and method for processing a handover (HO) according to a QoS policy of an MS in a wireless communication system.

Another aspect of the present invention is to provide an apparatus and method for processing a fast base station switching (FBSS) according to a QoS policy of an MS in a wireless communication system.

In accordance with an aspect of the present invention, a method of operating a BS in a wireless communication system is provided. The method includes: receiving a QoS policy information of an authenticated MS or a user from a network entity (NE) including a policy decision function (PDF) and storing the QoS policy information; upon detecting a network reentry of an MS in an idle mode, evaluating a QoS policy of the MS or the user; and controlling a state of a service flow allocated to the MS or the user according to the QoS policy.

In accordance with another aspect of the present invention, a method of operating a BS in a wireless communication system is provided. The method includes: receiving a QoS policy information of an MS, which performs hard HO, from a neighbor BS and storing the QoS policy information; upon detecting the MS attempting network re-entry, evaluating the QoS policy of the MS; and controlling a state of a service flow assigned to the MS according to the QoS policy.

In accordance with another aspect of the present invention, a method of operating a BS in a wireless communication system is provided. The method includes: receiving from a neighbor BS a request message including a QoS policy information of an MS performing an soft handover; evaluating the QoS policy information of the MS by analyzing the request message; assigning a traffic CID (TCID) to a service flow of the MS; and transmitting to the neighbor BS a response message including the assigned TCID.

In accordance with another aspect of the present invention, a BS apparatus in a wireless communication system, the apparatus comprising: a storage for storing QoS policy information of MSs; a state manager for managing, for each MS, an operation mode and a state of a service flow; a timer manager for managing a timer required for transition of the operation mode for each MS and a timer required for transition of the state of the service flow; and a controller for transitioning the operation mode or the state of the service flow of a corresponding MS when the timer is expired, and, upon detecting connection re-establishment of the MS, for controlling the state of the service flow assigned to the MS according to a QoS policy of the MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
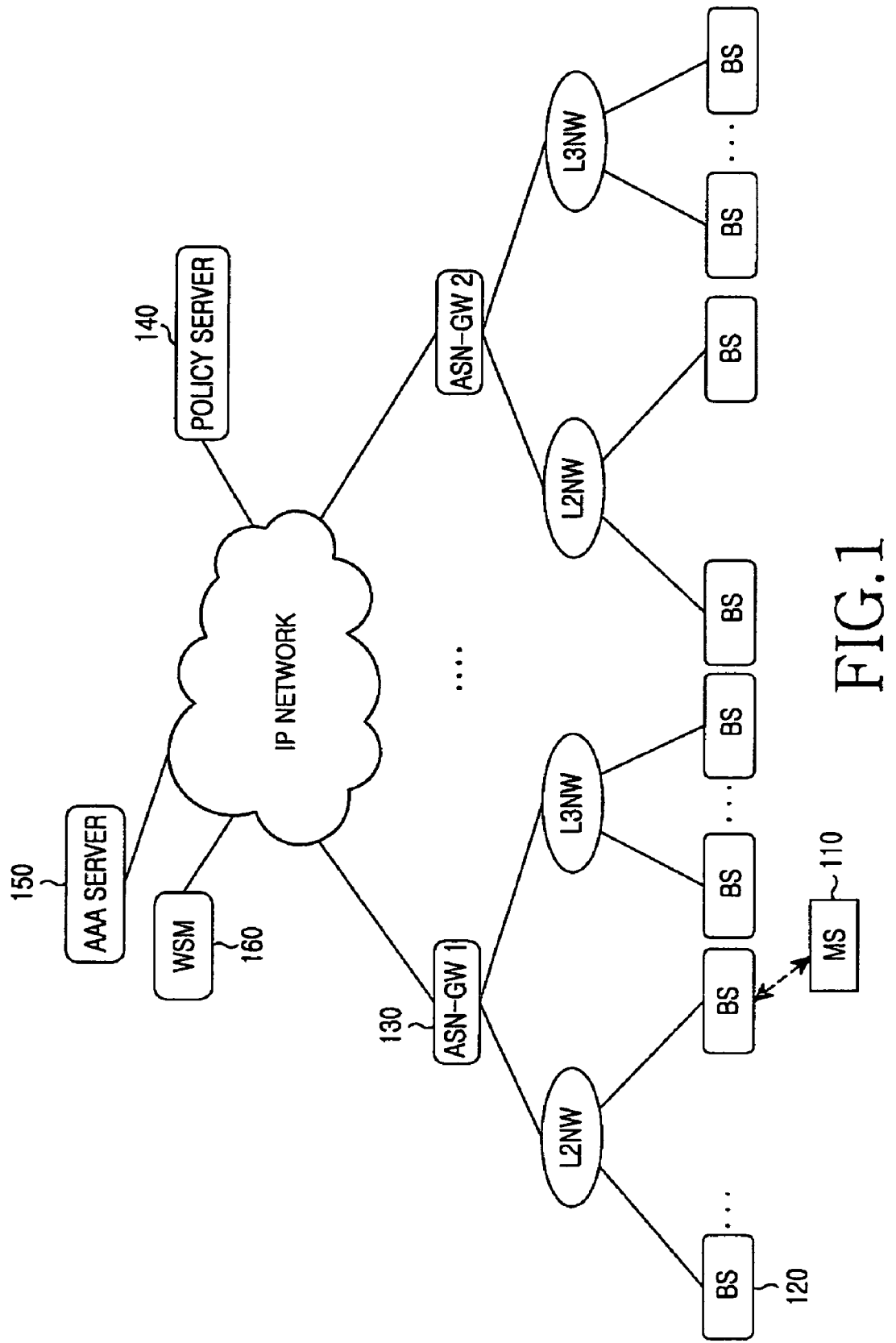
FIG. 1 illustrates a network configuration according to the present invention.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a method of operating quality of service (QoS) will be described when a quick connection setup (or network reentry) or a hard handover (HHO) or a fast base station switching (or soft handover) is performed in a broadband wireless access (BWA) system.

In the following descriptions, a network entity (NE) or network element (NE) is a term defined according to function, and the term may vary depending on a standardization group or an operator's intention. For example, a base station (BS) may be a radio access station (RAS). In addition, an access service network-gateway (ASN_GW) may be an access control router (ACR). The ASN_GW may also function as a router.

First, assumptions used in the present invention will be described.

It is assumed that per-flow QoS profile information (or a QoS parameter set) is delivered to a corresponding NE when a mobile station (MS) changes its serving BS in an awake mode or when the MS changes its anchor ASN_GW (or an ASN_GW which servers to manage a foreign agent (FA)). The per-user QoS information is continuously managed by the anchor ASN_GW. The QoS profile information is released when the MS transitions to a null mode.

All wireless networks have a limited number of "awake" users due to a limited wireless capacity. The number of "sleep" users may also be limited because of connection identifier (CID) resource management or the like. Likewise, regarding an idle mode, the number of "idle" users may also be limited because of a classification (CS) rule, QoS profile information management, or the like. In general, when a transition is made through a QCS from the idle mode to the awake mode, a BS transmits to an MS a service flow identifier vs. transport connection identifier (SFID vs. TCID) through a ranging response (RNG_RSP) message. Since the MS already has an SFID information, a connection can be established by mapping the TCID to the SFID. In case of a hard handover(i.e, HHO), the MS updates a TCID through a RNG_RSP message received from a target BS. In case of a soft handover (i.e., an FBSS), candidate target BSs of a diversity set generate TCIDs and deliver the TCIDs to a serving BS. The serving BS delivers the TCIDs of the candidate target BSs to the MS through a handover response (HO_RSP) message. Accordingly, a TCID of a target BS can be automatically assigned when the MS determines the target BS.

It will be assumed that a name tag (i.e., an SFID) of a media access control (MAC) layer is independently assigned by an ACR (or ASN_GW), and a CID is independently assigned by a BS. The CID is uniquely assigned for each flow in the BS. The SFID is uniquely assigned for each flow in the MS.

It will be assumed that a per-flow state is classified into a provisioned state, an admitted state, and an active state. The provisioned state indicates that only an SFID is assigned. The admitted state and the active state indicate that not only the SFID but also a transport CID (TCID) is assigned. The per-flow state can be determined in the active state when traffic flows.

In the following descriptions, a connection admission control (CAC) includes not only a narrow meaning of CAC based on a wireless capacity and a per-flow bandwidth request but also a broader meaning of CAC based on constraints on overload control (wherein, the overload is caused by a central processing unit (CPU) load), the number of subscribers, and the number of flows. For example, a candidate BS can be selected for a handover only when constraints on the limited number of subscribers and the overload control are satisfied.

FIG. 1 illustrates a network configuration according to the present invention.

Referring to FIG. 1, a network consists of an MS 110, a BS 120, an ASN_GW 130, a policy server 140, an authentication, authorization, and accounting (AAA) server 150, and a WiBro system manager (WSM) 160. A network consisting of the BS 120 and the ASN_GW 130 may be defined as an access service network (ASN). The WSM 160 may be referred to as an element management system (EMS). The policy server 140 may consist of a separate server as shown in the figure, or may be incorporated as an internal function of a specific network entity (e.g., the AAA server 150).

The AAA server 150 performs authentication and accounting on the MS 110 by interoperating with the ASN_GW 130. According to an embodiment of the present invention, when the authentication on the MS 110 is successful, the AAA server 150 transmits information on the MS 110 to the policy server 140. According to another embodiment of the present invention, a subscription profile repository (SPR) server that manages user information may be triggered by the AAA server 150 and thus transmit to the policy server 140 the information on the MS 110. On the contrary, the policy server 140 may obtain the information on the MS 110 by requesting the SPR server to send the information. The information on the MS 110 is a policy decision function (PDF) input parameter and may include a 5-tuple (i.e., a source & destination Internet protocol (IP) address, a source & destination port number, and a protocol identifier (ID)), a 6-tuple (i.e., 5-tuple+type of service (ToS)), a user class (e.g., premium, gold, silver, bronze, etc.), and a QoS setup type (e.g., static, dynamic, semi-dynamic, etc.).

Further, the AAA server 150 performs accounting on the MS 110. An accounting statistic period is defined as a period in which a service flow (SF) is activated in practice. For example, when the MS 110 moves, a start point, a middle point, and an end point of a traffic flow may be managed by different ASN_GWS. In this case, each ASN_GW reports an actual serving time to the AAA server 150. For another example, whenever an ASN_GW which serves to perform call processing is changed, accounting statistic information which has been gathered so far may be delivered to a target ASN_GW, and an ASN_GW at the end point may report the gathered accounting statistic information to the AAA server 150. If a subscriber identity module (SIM) card is included in the MS 110, the AAA server 150 may transmit the accounting statistic information gathered from the ASN_GW 130 to the MS 110 through an application layer. In this case, the accounting is performed in the SIM card of the MS 110. For another example, the accounting may be performed by the SIM card itself. In this case, the accounting statistic information may be gathered by the MS 110 itself, or may be provided from the ASN_GW 130. A common open policy service (COPS) interface or a remote authentication dial in user service (RADIUS) interface or a diameter interface may be used between the AAA server 150 and the ASN.

As described above, user information may be managed by the SPR server. That is, the SPR server can manage a user class ID, a QoS setup type (e.g., static, dynamic, semi-dynamic, etc.), a user location, and so forth. In this case, the user class ID and the QoS setup type may be provided by the SPR server to the policy server 140. The SPR function may be incorporated into the AAA server 150 or another server or may be independently provided by a separate server.

The policy server 140 generates a PDF output parameter by using the PDF input parameter received from the IMS server or the SPR server, and provides the generated PDF output parameter to a corresponding NE. The PDF output parameter according to the present invention is in association with a QoS policy used when a QCS or an HHO or an FBSS is performed. The PDF will be described below in detail with reference to Table 1. The policy server 140 transmits a QoS policy information regarding an authenticated MS 110 to the ASN connected with the MS 110.

The COPS interface or the RADIUS interface or the diameter interface may be used between the policy server 140 and the ASN. The PDF of the policy server 140 and a charging function can be implemented as one function which can be defined as a policy charging rule function (PCRF). The PDF may be implemented in an Internet multimedia subsystem (IMS) server or may exist as a separate server as shown in FIG. 1. For example, the PDF and a proxy-call session control function (P-CSCF) may be included in one server, and an interrogating-CSCF (I-CSCF) and a serving-CSCF (S-CSCF) may be included in another server. Further, the PDF may be divided into several sub-functions, and the sub-functions may exist in different NEs. That is, the PDF and SPR of the policy server 140 may exist in the AAA server 150 or may exist in separate servers. The SPR and PDF may be implemented with one server. It will be assumed hereinafter that both the PDF and the SPR are included in the AAA server 150.

The WSM 160 delivers information related to the network configuration to the ASN, and manages the ASN_GW 130 and the BS 120 which constitute the ASN. The COPS interface or the RADIUS interface or the diameter interface may be used between the WSM 160 and the ASN.

The ASN_GW 130 transmits to the BS 120 a traffic from a core service network (CSN), and transmits to the core network a traffic from the BS 120. In this case, the ASN_GW 130 manages an SF, a connection, and a mobility for each MS 110. A unique SF is generated for each of uplink and downlink connections. For example, in case of static QoS, when a dynamic service addition (DSA) trigger request message is received for a specific MS 110 from the AAA server 150, the ASN_GW 130 generates a static SF for the MS 110 and transmits the DSA trigger request message including an SFID to the BS 120.

The BS 120 transmits to the MS 110 a traffic from the ASN_GW 130, and transmits to the ASN_GW 130 a traffic from the MS 110. The BS 120 is connected to the ASN_GW 130 in a wired fashion, and is connected to the MS 110 in a wireless fashion. The BS 120 performs scheduling according to MAC layer QoS, and thus allocates resources to the MS 110. For example, in case of static QoS, when the DSA trigger request message is received from the ASN_GW 130, the BS 120 obtains a QoS parameter from the ASN_GW 130, and performs a DSA process with the MS by using the QoS parameter. Herein, the QoS mapping table may be included in a specific NE within the ASN. the QoS mapping table is usually included in the ASN_GW 130 or may be included in both the BS 120 and the ASN_GW 130. As such, an SF is generated by performing the DSA process, and the SF is activated in practice by performing the DSA process or a dynamic service change (DSC) process. When an SF is activated to an admitted state or an active state, the BS 120 performs a CAC, assigns a TCID, and transmits a traffic by using the TCID.

According to the present invention, the ASN receives the QoS policy information regarding the authenticated MS 110 from the AAA server 150. The QoS policy information may be a per-user QoS parameter. The per-user QoS parameter includes a per-flow QoS parameter, a CS rule, a domain or mobile virtual network operator (MVNO) identifier, an idle timer, and so forth. Then, the BS 120 stores the received QoS policy information and controls the QCS or HHO or FBSS of the MS 110 according to the stored QoS policy information. For example, when the MS 100 performs the QCS, whether to perform the CAC is determined according to the QoS policy. When the CAC is performed, the BS 120 restores SFs to a previous state through the CAC. Further, according to the QoS policy, the BS 120 can process flows not restored to the previous state. The method of operating QoS when the QCS or HHO or FBSS is performed will be described below in greater detail with reference to the accompanying drawings.

Meanwhile, the ASN manages both the per-user mode and the per-flow state. Examples of the per-user mode include an awake mode, a sleep mode, and an idle mode. Examples of the per-flow state include the active state, the admitted state, and a provisioned state. For example, when an MS, to which an SF is statically allocated, transitions to the idle mode, only an SFID and QoS profile information can be maintained for that MS. When the MS transitions from the idle mode to the awake mode through the QCS, the BS performs the CAC according to a QoS policy (i.e., per-user QoS information). If the SF is admitted in the CAC, the BS delivers a RNG-RSP message including "SFID vs. TCID" to the MS. In this case, since the MS already has the SFID and QoS information, the MS performs management by mapping SFIDs to corresponding TCIDs. A network between the ASN_GW 130 and the BS 120 may be a layer 2 (L2: Ethernet) network or a layer 3 (L3: IP) network.

The MS 110 performs the DSA process with the BS 120 and thus generates an QoS SF. When QoS of the SF needs to be changed into a semi-dynamic QoS type or a dynamic QoS type, the MS 110 performs the DSC process with the BS 120 and thus can change the QoS parameter.

Even if a MS in the awake or the sleep mode moves to another subnet within the same ASN, an anchor ASN_GW (or an ASN_GW which serves to manage an FA) is not changed. In this case, per-flow QoS profile information for the MS is delivered to a new serving BS through tunneling or L2 extension. It is assumed that the per-user QoS information of the MS is continuously managed by the anchor ASN_GW. Of course, when a transition is made to a null mode, the ASN releases the QoS policy information of the MS. When the MS moves from one ASN to another ASN (that is, an inter-ASN handover), it is assumed that the anchor ASN_GW is relocated.

Although not shown in FIG. 1, it is apparent that NEs (i.e., a dynamic host configuration protocol (DHCP), a home agent (HA), and a foreign agent (FA)) for allocating an IP address to the MS and a domain name server (DNS) for managing a mapping relationship between a network access identifier (NAI) and the IP address can be provided.

Detailed operations will be described after PDF input and output parameters are defined.

Examples of the PDF input parameter may include a 5-tuple (i.e., a source & destination IP address, a source & destination port number, and a protocol ID), a 6-tuple (i.e., 5-tuple+type of service (ToS)), a user class (e.g., premium, gold, silver, bronze, etc.), and a QoS setup type (e.g., static, dynamic, semi-dynamic, etc.). The 5-tuple and the 6-tuple are used to identify a flow, and thus have to be delivered to an NE (e.g., an ASN_GW) which serves to manage a CS rule.

The PDF output parameter may be defined as a QoS parameter set (or group) for an IP QoS (i.e., a diffserv code point (DSCP)) and for a MAC QoS (e.g., Institute of Electrical and Electronics Engineers (IEEE) 802.16 QoS parameters). Examples of the IEEE 802.16 QoS parameters include a traffic priority, a maximum sustained rate, a minimum reserved rate, a maximum latency, a grant interval, and so forth.

In addition to the aforementioned PDF output parameter, per-user QoS parameter information may be additionally provided as defined in Table 1 below.

TABLE 1

| | parameter | description |
|---|---|---|
| QCS | a parameter indicating whether a service flow is restored to a previous state | manage all flows in a provisioned state if not restored to the previous state |
| | a parameter indicating schemes for processing flows denied in CAC, if restored to the previous state | 1. complete QCS while unrestored flows remain in the provisioned state 2. treat QCS as failure 3. perform CAC until all flows are restored 4. perform load balancing |
| | a parameter indicating states of flows admitted in CAC | 1. active state 2. admitted state |
| HHO | a parameter indicating whether to perform CAC in a target BS | assign TCIDs to flows in the active or admitted state if CAC is not performed |
| | a parameter indicating schemes for processing flows denied in CAC, if CAC is performed | 1. manage flows denied in CAC in the provisioned state 2. continuously perform CAC 3. release flows denied in CAC by not updating CIDs 4. perform load balancing |
| FBSS | a parameter indicating whether to perform CAC of a candidate BS | assign TCIDs to flows in the active or admitted state if CAC is not performed (resource reservation) |
| | a parameter indicating schemes for processing flows | 1. transition a corresponding flow to the provisioned state in case of static |

TABLE 1-continued

| parameter | description |
| --- | --- |
| not assigned with TCIDs, when switched to a target BS | QoS (CAC can be performed for a certain period of time which is set by a timer) 2. delete the corresponding flow in case of dynamic QoS (deletion can be performed automatically or through DSD) |

Table 1 above shows per-user QoS information according to the present invention. In addition to the PDF output parameter, the following parameters maybe further included, that is, a parameter indicating compression or non-compression of an IP header and a compression scheme, a parameter indicating use or non-use of a traffic encryption key (TEK), a parameter indicating whether a current state is a pre-provisioned state, a parameter selecting one of provisioned/admitted/active states when the current state is not the pre-provisioned state, a parameter indicating grant or denial of QoS change by using the DSC, a parameter indicating the number of times of changing QoS in the active state, a parameter indicating a processing scheme for a QoS parameter which is not exchanged by using the DSC, a parameter indicating a required reliability, a parameter indicating a condition for compulsory call release, a parameter indicating a retransmission scheme, a parameter indicating a processing scheme when the number of users in the active state in a serving BS exceeds a threshold, a parameter indicating whether a symmetric QoS flow is provided, a parameter indicating a possible maximum number of times of using the DSC, a parameter indicating grant or denial of a flow timer and a timer value, a parameter indicating possibility of a horizontal handover, a parameter indicating possibility of a vertical handover, and a parameter indicating grant or denial for a dynamic service deletion (DSD).

When the DSC is performed, a policy and charging enforcement function (A-PCEF) of the ASN_GW can independently determine grant or denial without the aid of the CSN. For this, a PDF (e.g., an AAA or PCRF or universal service interface (USI) server or an EMS) may transmit a local policy to the ASN. For example, as defined in the IEEE 802.16, a parameter set is delivered to the ASN according to each state (i.e., the provisioned state, the admitted state, the active state), and a specific QoS parameter in the active state can be changed only within a range of a corresponding QoS parameter value in the admitted state or the provisioned state. Likewise, a specific QoS parameter in the admitted state can be changed only within a range of a corresponding QoS parameter value in the provisioned state.

In case of semi-dynamic QoS, the A-PCEF of the ASN may independently determine whether to change QoS as described above or may interoperate with the CSN (e.g., the AAA or PCRF or USI server) to determine whether to change QoS according to the PDF policy of the CSN.

When initial connection is performed, a QoS profile is determined according to a predetermined policy of a service provider. When re-connection is performed, the CSN (e.g., the AAA or PCRF or USI server) may be involved so that a QoS policy state of the initial connection is restored according to the policy of the service provider. Further, the CSN may update the QoS profile according to the changed QoS policy of the service provider.

As described above, examples of the QoS setup type include the static type, the semi-dynamic type, and the dynamic type. To facilitate explanation, it will be assumed hereinafter that the QoS setup type of the MS is the static type.

Figure 2:
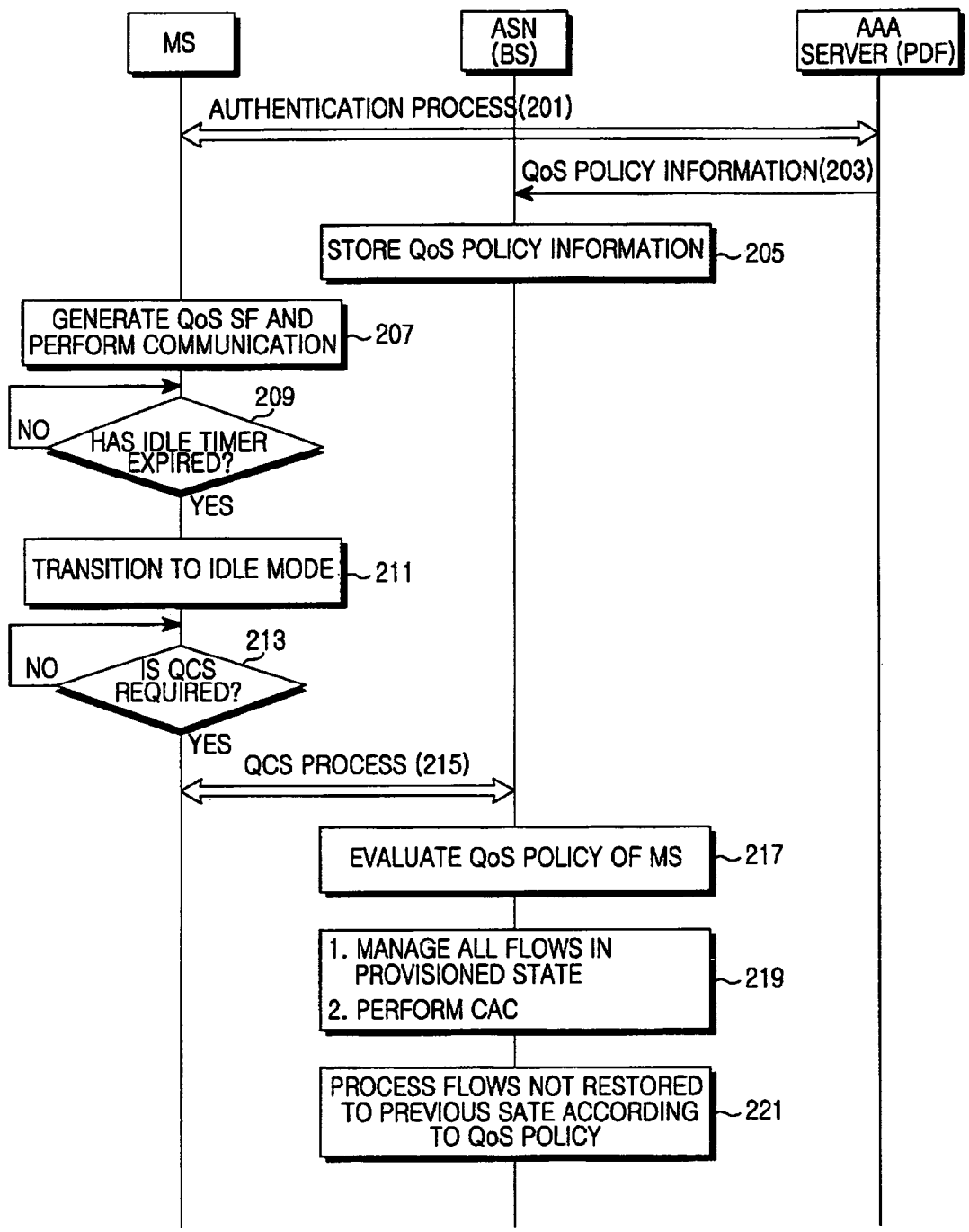
FIG. 2 illustrates an operation of performing a quick connection setup (QCS) on the basis of a quality of service (QoS) policy in a wireless network according to the present invention.

FIG. 2 illustrates an operation of performing a QCS on the basis of a QoS policy in a wireless network according to the present invention.

Referring to FIG. 2, an MS, which attempts initial entry to the network, obtains synchronization by using a preamble signal received from a BS. Upon obtaining synchronization, the MS receives a MAP message, a downlink channel descriptor (DCD) message, and an uplink channel descriptor (UCD) message and thus obtains system parameters required for communication. Thereafter, the MS performs an initial network entry process with the BS. The initial network entry process may include a ranging process (i.e., ranging-request/ranging-response (RNG-REQ/RNG-RSP)), a basic capability negotiation process (i.e., SS basic capability (SBC)-REQ/SBC-RSP), an authentication process (i.e., private key management (PKM)), a registration process (i.e., registration-request/registration-response (REG-REQ/REG-RSP), and so forth. That is, in the initial network entry process, the MS performs the authentication process with the BS in step 201. In this case, the BS performs the authentication process on the MS by interoperating with an AAA server.

The AAA server generates a PDF output parameter (i.e., a QoS policy information) by using information on the authenticated MS. The QoS policy information may include not only per-flow QoS profile information but also per-user QoS information as shown in Table 1 above. In step 203, the AAA server transmits QoS policy information on the MS to the ANS. Then, in step 205, the BS stores the QoS policy information received from the AAA server.

Meanwhile, in step 207, the MS interoperates with the ASN and a core service network (CSN) to generate a QoS SF, and performs traffic communication through the QoS SF.

While performing the traffic communication, the MS examines whether an idle timer has expired in step 209. The idle timer expires when there is no traffic flow for a predetermined time period. The idle timer is operated not only in the MS but also in the BS. If the idle timer has expired either in the MS or the BS, the MS exchanges a message with the BS and transitions to the idle mode in step 211.

If traffic is produced while in the idle mode, the MS can transition to the awake mode by performing a QCS process. That is, the MS examines whether the QCS is required in step 213. If the QCS is required, the MS performs the QCS process with the BS in step 215. In this case, the MS transmits a ranging code to the BS, and in response thereto, the BS transmits to the MS a ranging response (RNG-RSP) message and a resource allocation message (i.e., CDMA_alloc_IE). Then, the MS transmits a ranging request (RNG-REQ) message through an allocated resource. At this time point, the BS can identify the MS.

When the MS, which performs the QCS, is identified, the BS evaluates the QoS policy information of the MS in step 217. That is, the BS evaluates a QoS policy to be used when the QCS process is performed. Thereafter, in step 219, the BS determines if service flows of the MS will be restored to a previous state according to the QoS policy. If it is determined that the service flows are not restored to the previous state, the BS allows the service flows of the MS to transition to the provisioned state. Otherwise, if it is determined that the service flows are restored to the previous state, the BS restores the service flows to the previous state by performing a CAC. Herein, if the previous state of the service flow is provisioned state, the service flow can be stayed in provisioned state.

In this case, if there is a flow not restored to the previous state, in step 221, the BS processes the flow according to the QoS policy. Specifically, according to the QoS policy, the QCS may be completed while the unrestored service flow remains in provisioned state or deleted. In addition, the QCS may be treated as a failure, or the QCS may be continuously performed until all service flows are restored, or load balancing may be performed. If the QCS is completed, the BS transmits to the MS a ranging response (RNG-RSP) message including "SFID vs. TCID". For a provisioned Service flow, CID update using a ranging response message is not performed, a ranging response message of which CID corresponding a SFID is set null is transmitted, or a ranging response message which include only SFID is transmitted. If the QCS is treated as a failure, the BS transmits to the MS a ranging response message in which a ranging state is set to 'abort'. If the QCS is performed until all service flows are restored, the BS may transmit to the MS a ranging response message in which the ranging state is set to 'continue'.

If a service flow is managed in the provisioned state, the BS and the MS may manage the service flow in the provisioned state without having to perform an additional process, or may negotiate a transition to the provisioned state by performing the DSC process.

The CAC result may be set in a service level prediction (SLP) field of the ranging response message. That is, whether all SFs can be restored, whether only some of them can be restored, or whether no SF can be restored due to insufficient resources can be set in the ranging response message and can be reported to the MS. A service flow admitted in the CAC may be managed in the active state or an admitted state according to the QoS policy.

Figure 3:
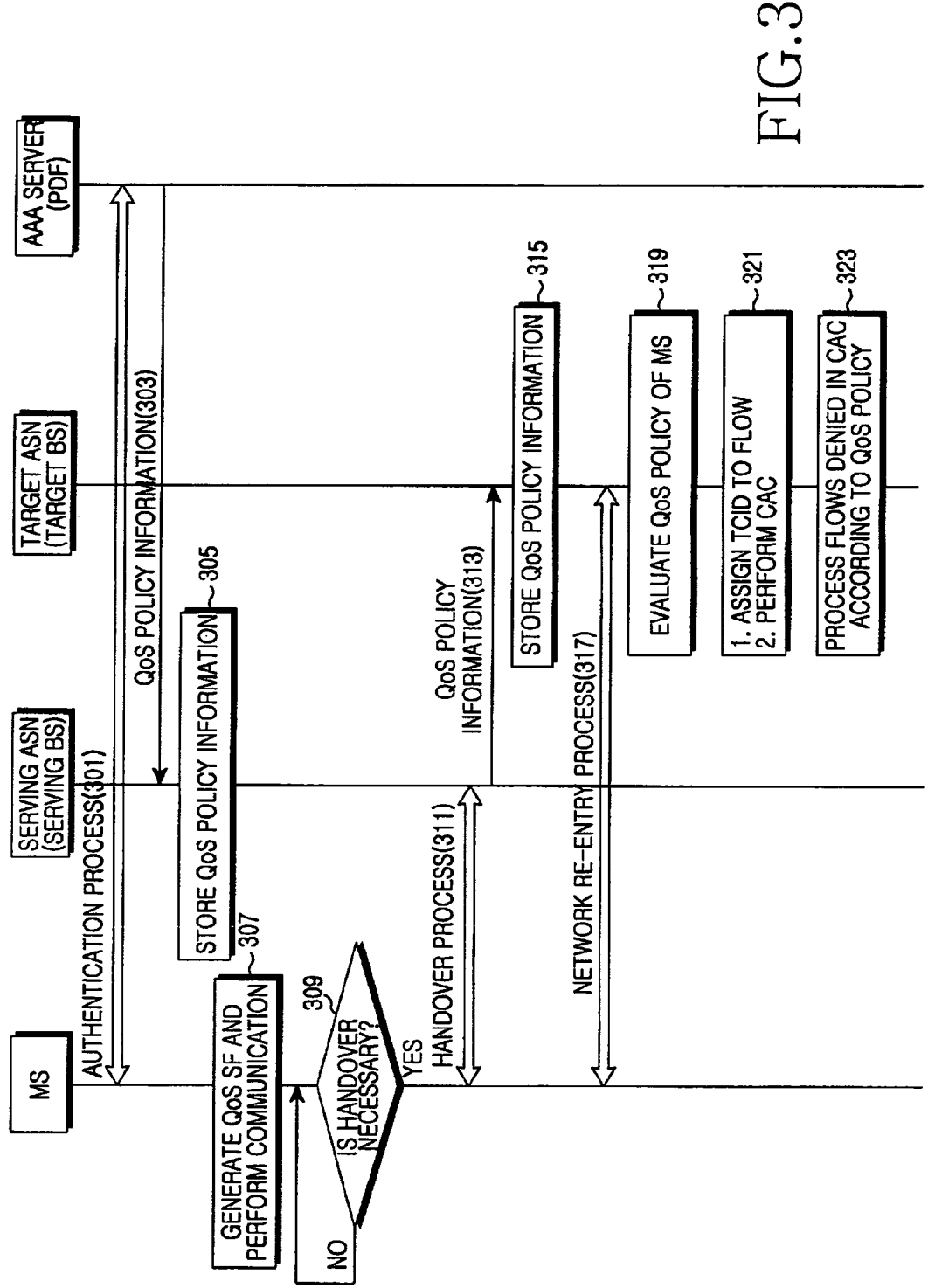
FIG. 3 illustrates an operation of performing a hard handover (HHO) on the basis of a QoS policy in a wireless network according to the present invention.

FIG. 3 illustrates an operation of performing an HHO on the basis of a QoS policy in a wireless network according to the present invention.

Referring to FIG. 3, an MS, which attempts initial entry to the network, obtains synchronization by using a preamble signal received from a BS. Upon obtaining synchronization, the MS receives a MAP message, a DCD message, and a UCD message and thus obtains system parameters required in communication. Thereafter, the MS performs an initial network entry process with the BS.

That is, in the initial network entry process, the MS performs an authentication process with the BS in step 301. In this case, the BS performs the authentication process on the MS by interoperating with an AAA server.

The AAA server generates a PDF output parameter (i.e., an QoS policy information) by using information on the authenticated MS. The QoS policy information may include not only per-flow QoS profile information but also per-user QoS information as shown in Table 1 above. In step 303, the AAA server transmits a QoS policy information on the MS to the ANS. Then, in step 305, the serving BS stores the QoS policy information received from the AAA server.

Meanwhile, in step 307, the MS interoperates with the ASN and a CSN to generate a QoS SF, and performs traffic communication with the serving BS through the QoS SF While performing the traffic communication, the MS scans neighbor BSs in step 309, and compares signal strength of the serving BS with those of neighbor BSs to determine whether a handover is necessary. If it is determined that the handover is necessary, the MS performs a handover process with the serving BS in step 311. For example, the MS transmits to the BS a handover request message including reception strength of candidate BSs, and the BS receives service capability information (e.g., a bandwidth, a service level, and so forth) of the candidate BSs and thereafter determines a handover target BS. In this case, the service capability information may include not only the bandwidth and the service level but also a result of a CAC on the MS. Therefore, a report message including the service capability information may include a parameter which indicates whether the CAC is admitted for all service flows, some of the service flows, or no service flow, a parameter which indicates whether the CAC is admitted for each service flow, and a parameter which indicates the number of service flows for which the CAC is admitted. Thereafter, the BS transmits to the MS a handover response message including information on the target BS. If the handover to the target BS is finally determined, the MS transmits to the serving BS a handover indication message and then attempts to access to the target BS.

Upon receiving the handover indication message, the serving BS transmits to the target BS the QoS policy information on the MS in step 313. In this case, not only a QoS profile ID (or QoS profile information) on each SF but also per-user QoS information is transmitted to the target BS. In step 315, the target BS stores the QoS policy information.

In step 317, the target BS performs a network re-entry process with the MS. In this case, the MS transmits a ranging code to the target BS, and in response thereto, the target BS transmits to the MS a ranging response message and a resource allocation message (i.e., CDMA_alloc_IE). Then, the MS transmits a ranging request message through an allocated resource. At this time point, the target BS can identify the MS.

When the MS, which performs the handover, is identified as described above, the target BS evaluates the QoS policy information of the MS in step 319. That is, the serving BS evaluates a QoS policy to be used when the handover is performed. Thereafter, in step 321, the target BS determines if there is a need to perform the CAC on the MS according to the QoS policy. If it is determined that the CAC is not performed, the target BS assigns TCIDs to service flows of the MS in an active state or an admitted state. Otherwise, if it is determined that the CAC is performed, the BS performs the CAC and assigns the TCID according the CAC result.

In this case, if there is a service flow which was denied in the CAC, in step 323, the target BS processes the service flow according to the QoS policy. Specifically, according to the QoS policy, the service flow which was denied in the CAC may be managed in the provisioned state, or the network re-entry process (i.e., the ranging process) may be continuously performed until the service flow is admitted in the CAC. In addition, the service flow may be deleted by not updating a CID. In addition, load balancing may be performed. If a QoS type of the MS is 'dynamic', a service flow not assigned with a TCID may be subjected to a process for transitioning to the provisioned state, or may be deleted automatically or by performing a DSD process. If the service flow is assigned with the TCID, the target BS transmits to the MS a ranging response message including "SFID vs. TCID". For a provisioned Service flow, CID update using a ranging response message is not performed, a ranging response message of which CID corresponding a SFID is set null is transmitted, or a ranging response message which include only SFID is transmitted. If the ranging process is continuously performed until all service flows are admitted in the CAC, the target BS may transmit to the MS a ranging response message in which a ranging state is set to 'continue'.

If a service flow is managed in the provisioned state, the target BS and the MS may manage the service flow in the provisioned state without having to perform an additional process, or may negotiate a transition to the provisioned state by performing the DSC process. Regarding a service flow which transitions to the provisioned state, it is no longer necessary to buffer bearer traffic in a previous serving BS, a target BS, and an anchor ASN_GW.

The CAC result may be set in an SLP field of the ranging response message. That is, whether all SFs can be restored, whether only some of them can be restored, or whether no SF can be restored due to insufficient resources can be set in the ranging response message and can be reported to the MS.

Figure 4:
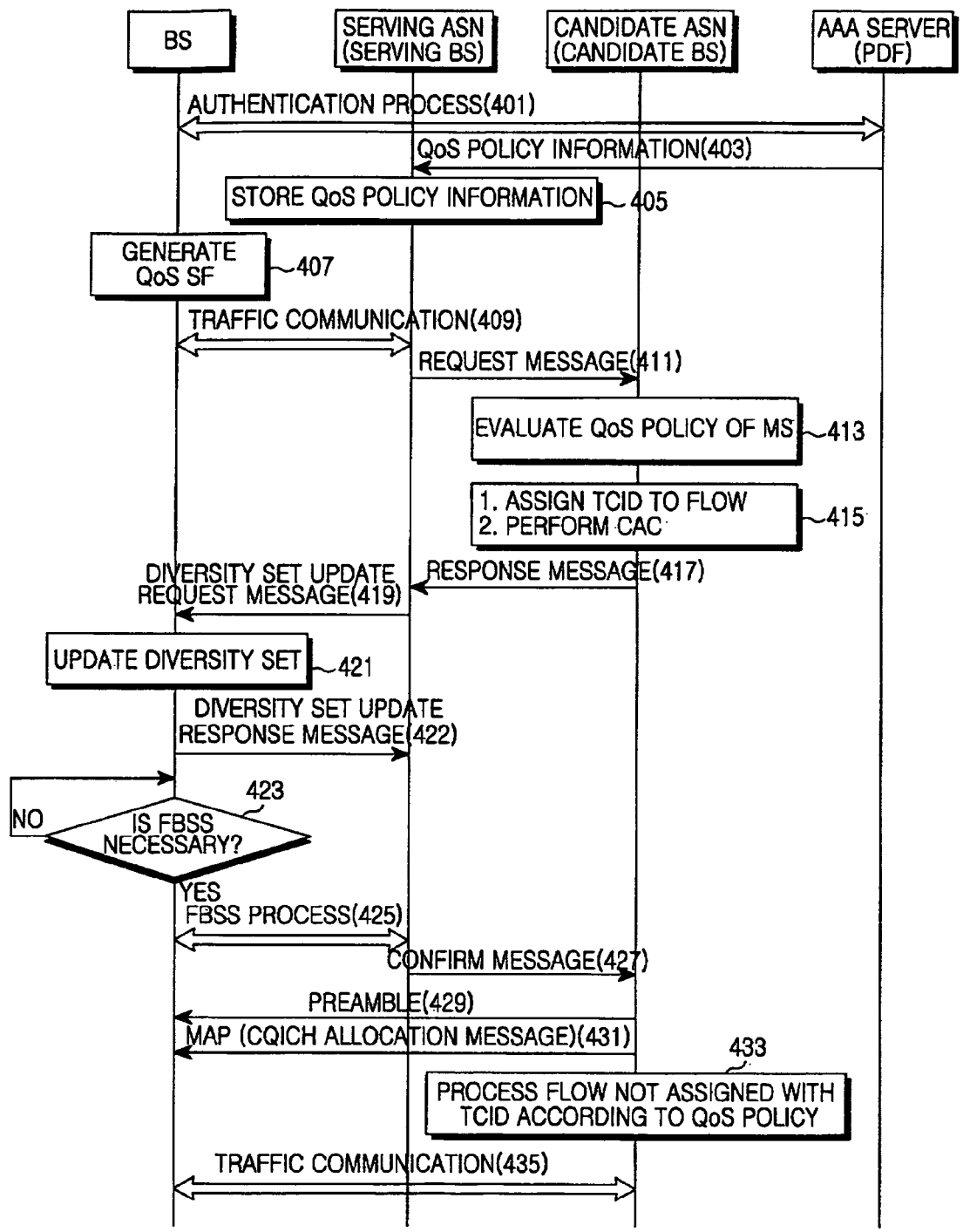
FIG. 4 illustrates an operation of performing a fast base station switching (FBSS) on the basis of a QoS policy in a wireless network according to the present invention.

FIG. 4 illustrates an operation of performing an FBSS on the basis of a QoS policy in a wireless network according to the present invention.

Referring to FIG. 4, an MS, which attempts initial entry to the network, obtains synchronization by using a preamble signal received from a BS. Upon obtaining synchronization, the MS receives a MAP message, a DCD message, and a UCD message and thus obtains system parameters required for communication. Thereafter, the MS performs an initial network entry process with the BS.

That is, in the initial network entry process, the MS performs an authentication process with the BS in step 401. In this case, the BS performs the authentication process on the MS by interoperating with an AAA server.

The AAA server generates a PDF output parameter (i.e., a QoS policy information) by using information on the authenticated MS. The QoS policy information may include not only per-flow QoS profile information but also per-user QoS information as shown in Table 1 above. In step 403, the AAA server transmits a QoS policy information on the MS to the ANS. Then, in step 405, the serving BS stores the QoS policy information received from the AAA server.

Meanwhile, the MS interoperates with the ASN and a CSN to generate a QoS SF in step 407, and performs traffic communication with the serving BS through the QoS SF in step 409.

While performing the traffic communication, the MS and the serving BS update a diversity set for the FBSS periodically or in an event-triggered manner. The diversity set represents a group of candidate BSs to which the MS can move. Specifically, in step 411, the serving BS transmits to the candidate BSs a request message which inquires service capability through a backbone network. The request message may include a parameter which indicates a QoS policy of the MS.

In step 413, the candidate BS analyzes the request message and evaluates the QoS policy of the MS. In step 415, the candidate BS determines if CAC needs to be performed on the MS according to the QoS policy. If it is determined that the CAC is not performed, the candidate BS assigns TCIDs to all service flows of the MS in an active state or an admitted state. Otherwise, if it is determined that the CAC is performed, the BS performs the CAC and assigns the TCIDs to the service flows according to the CAC result. It will be assumed hereinafter that the candidate BS performs the CAC.

In step 417, the candidate BS configures a response message including the CAC result and transmits the response message to the serving BS. The response message may include a parameter which indicates whether all service flows are admitted, only some service flows are admitted, or no service flow is admitted and may also include information on TCIDs assigned to the admitted service flows.

Meanwhile, after receiving the CAC result from at least one candidate BS, in step 419, the serving BS configures a diversity set update request (i.e., BSHO_REQ) message on the basis of the received CAC result, and transmits the diversity set update request message to the MS.

In step 421, the MS updates the diversity set managed by the MS on the basis of the diversity set update request message. The diversity set includes TCID information of each service flow, wherein the TCID is assigned by each candidate BS to the MS. In response thereto, in step 422, the MS transmits to the serving BS a diversity set update response message. The diversity set may be updated at the request of the BS or the MS. Further, the diversity set may be updated periodically or in an event-triggered manner.

While performing the traffic communication, the MS examines whether the FBSS is necessary in step 423. That is, the MS examines a specific candidate BS which is included in the diversity set and to which switching is required. If it is determined that the FBSS is necessary, the MS performs an FBSS process on the serving BS in step 425. In this case, the MS determines a target BS among the candidate BSs, transmits to the serving BS an indication message including information on the target BS, and performs switching to the target BS. Upon receiving the indication message, in step 427, the serving BS transmits to the target BS a confirm message which informs that the MS has switched to the target BS.

After transmitting the indication message, in step 429, the MS receives a preamble signal from the target BS and thus obtains synchronization. After obtaining synchronization, the MS receives and analyzes a MAP message in step 431. In this case, the MS can evaluate an allocation message (i.e., CQICH_alloc_IE) including information on channel quality indicator channel (CQICH) resources allocated to the MS itself. That is, upon receiving the confirm message, the target BS allocates the CQICH resources to the MS, and broadcasts the allocation message (i.e., CQICH_alloc_IE) including the information on the allocated resources.

In step 433, the target BS processes service flows not assigned with TCIDs according to the QoS policy of the MS. According to the QoS policy, the service flows not assigned with the TCIDs may-be managed in a provisioned state, or the CAC may be continuously performed for a certain period of time by setting a timer. If a QoS type of the MS is 'dynamic', a service flow not assigned with a TCID may be managed in the provisioned state, or may be deleted automatically or by performing a DSD process. If the service flow is assigned with the TCID according to the aforementioned operation, the BS can transmit to the MS a ranging response message including "SFID vs. TCID". For a provisioned Service flow, CID update using a ranging response message is not performed, a ranging response message of which CID corresponding a SFID is set null is transmitted, or a ranging response message which include only SFID is transmitted. In step 435, the MS which has switched to the target BS performs traffic communication by using the TCID assigned by the target BS.

If a flow is managed in the provisioned state, the BS and the MS may manage the flow in the provisioned state without having to perform an additional process, or may negotiate a transition to the provisioned state by performing a DSC process. Regarding a flow which transitions to the provisioned state, it is no longer necessary to buffer bearer traffic in a previous serving BS, a target BS, and an anchor ASN_GW.

Meanwhile, while performing the FBSS, if the MS connected to the serving BS generates a new SF or deletes (or changes) a previous SF, the MS and the serving BS may perform a diversity set update process through a BSHO_REQ/MSHO_REQ message. If the new SF is generated, the ASN assigns an SFID and a TCID. According to the current standard, the BSHO_REQ/BSHO_RSP message includes a field indicating the TCID but does not include a field indicating the SFID. Therefore, field addition is required. In this case, the request message may include a QoS parameter which indicates whether the candidate BSs will perform the CAC on only changed flows or whether the candidate BSs will re-perform the CAC on all flows.

Figure 5:
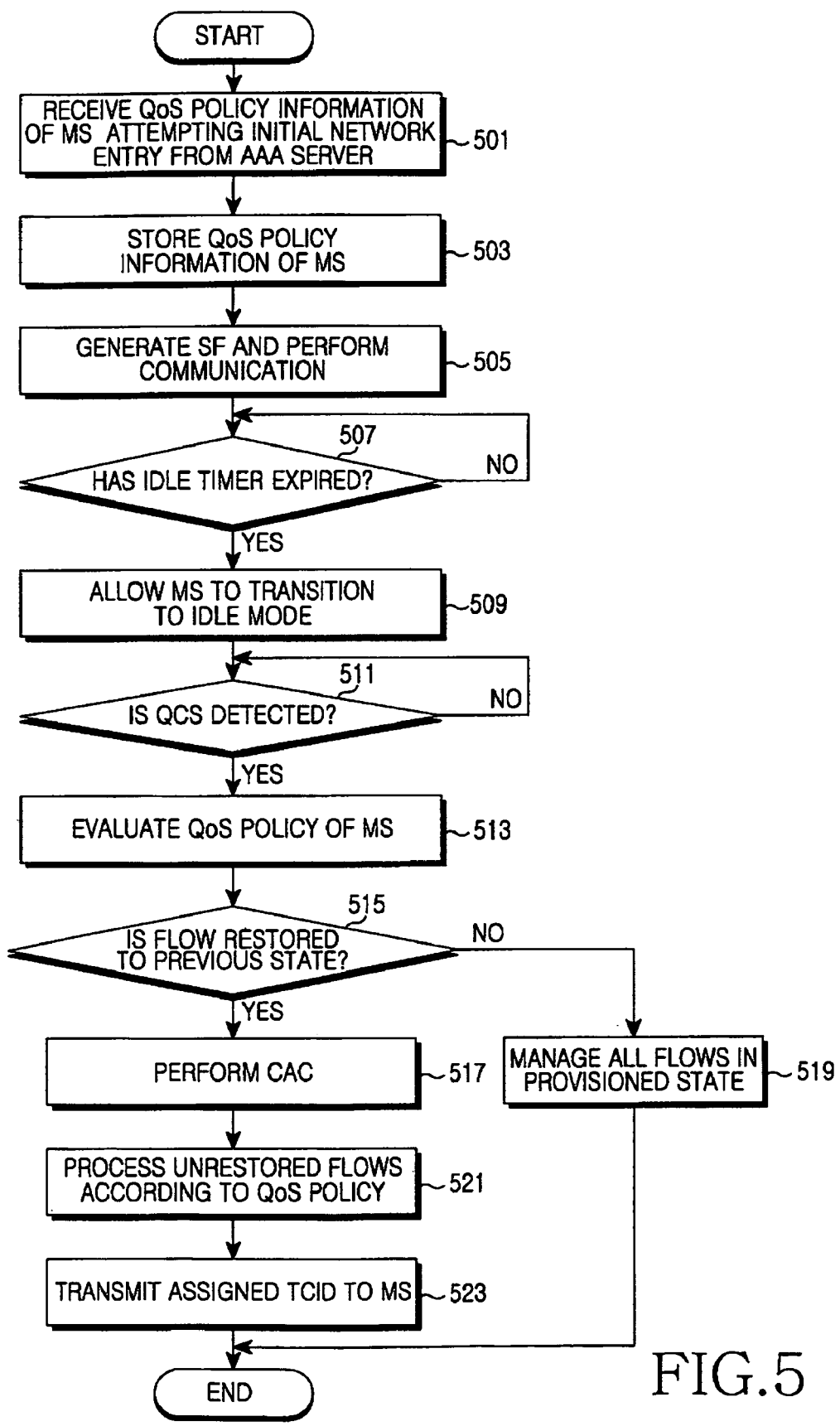
FIG. 5 is a flowchart illustrating an operation of performing a QCS in a base station (BS) according to the present invention.

FIG. 5 is a flowchart illustrating an operation of performing a QCS in a BS according to the present invention.

Referring to FIG. 5, in step 501, the BS receives a QoS policy information of an MS attempting initial network entry from an AAA server. In step 503, the BS stores the QoS policy information of the MS. The QoS policy information may include not only per-flow QoS profile information but also per-user QoS information as shown in Table 1 above.

In step 505, the BS interoperates with the MS and a CSN to generate a QoS SF, and performs traffic communication through the generated SF. For example, if a QoS setup type of the MS is 'static' or 'semi-dynamic', the BS performs a DSA process with the MS in the initial network entry and thus generates a static SF in a provisioned state. Thereafter, traffic communication can be performed by assigning a TCID through a DSC process.

While performing the traffic communication, the BS examines whether an idle timer has expired in step 507. The idle timer expires when there is no traffic flow for a predetermined time period. The idle timer is operated not only in the MS but also in the BS. If the idle timer has expired, proceeding to step 509, the BS exchanges a message with the MS and allows the MS to transition to an idle mode.

While in the idle mode, the BS examines whether a QCS process is performed with the MS in step 511. While performing the QCS process, the MS transmits a ranging code to the BS. Then, in response thereto, the BS transmits to the MS a ranging response message and a resource allocation message (i.e., CDMA_alloc_IE). Then, the MS transmits a ranging request message through an allocated resource. At this time point, the BS can identify the MS performing the QCS.

Upon identifying the MS performing the QCS, the BS evaluates the pre-stored QoS policy information of the MS in step 513. That is, the BS evaluates a QoS policy to be applied to the MS when the QCS process is performed. Thereafter, in step 515, the BS determines if service flows of the MS will be restored to a previous state according to the QoS policy. If it is determined that the service flows are not restored to the previous state, proceeding to step 519, the BS manages all service flows of the MS in the provisioned state. Otherwise, if it is determined that the service flows are restored to the previous state, proceeding to step 517, the BS restores the service flows to the previous state by performing a CAC. The service flows admitted in the CAC are restored to the previous state.

In step 521, the BS processes the service flows not restored to the previous state according to the QoS policy. That is, the QCS may be completed while the unrestored service flows remain in the provisioned state. In addition, the QCS may be treated as a failure. In addition, the QCS may be continuously performed until all service flows are restored. In addition, load balancing may be performed.

If the QCS is completed, proceeding to step 523, the BS transmits to the MS a ranging response message including "SFID vs. TCID". The ranging response message may include CAC result information. If a service flow is managed in the provisioned state, the BS and the MS may manage the service flow in the provisioned state without having to perform an additional process, or may negotiate a transition to the provisioned state by performing the DSC process.

Figure 6:
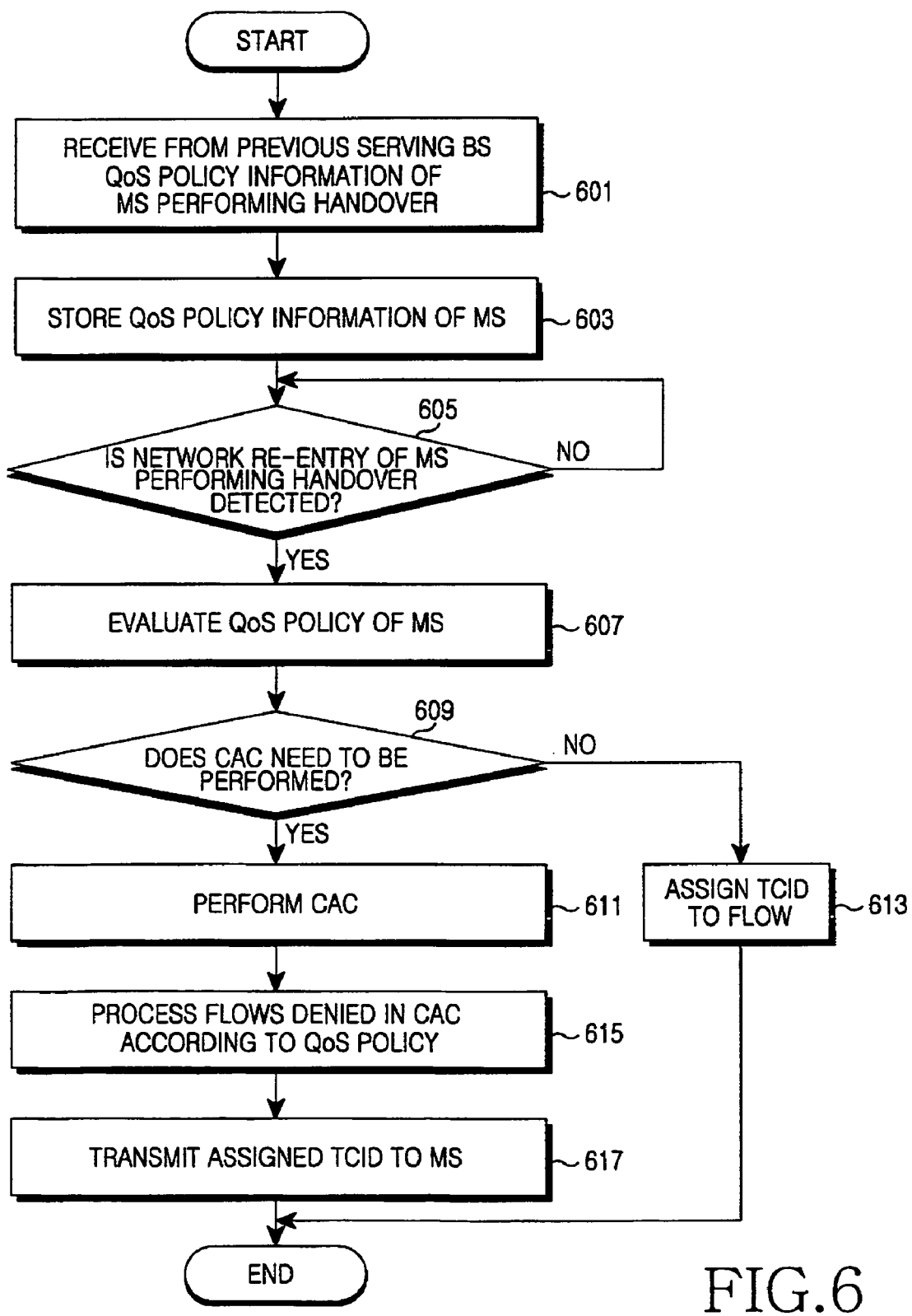
FIG. 6 is a flowchart illustrating an operation of performing an HHO in a BS according to the present invention.

FIG. 6 is a flowchart illustrating an operation of performing an HHO in a BS according to the present invention. In particular, FIG. 6 illustrates an operation of a target BS when an MS performs the HHO.

Referring to FIG. 6, in step 601, the target BS receives, from a previous serving BS, a QoS policy information of the MS performing a handover. That is, when the handover of the MS is finally determined, the previous serving BS transmits to the target BS the QoS policy information of the MS. In this case, not only QoS profile information on each SF but also per-user QoS information is transmitted to the target BS. In step 603, the BS (i.e., the target BS) stores the QoS policy information of the MS.

In step 605, the BS examines whether a network re-entry process is performed with the MS. When the network re-entry process is performed, the MS transmits a ranging code to the BS, and in response thereto, the BS transmits to the MS a ranging response message and a resource allocation message (i.e., CDMA_alloc_IE). Then, the MS transmits a ranging request message through an allocated resource. At this time point, the BS can identify the MS.

Upon identifying the MS performing the handover, the BS evaluates the QoS policy of the MS in step 607, wherein the QoS policy is received from the previous serving BS. That is, the BS evaluates a QoS policy to be applied to the MS when the HHO is performed. In step 609, the BS determines if a CAC needs to be performed for service flows of the MS according to the QoS policy. If it is determined that the CAC does not need to be performed, proceeding to step 613, the BS assigns TCIDs for all service flows in an active state or an admitted state. Otherwise, if it is determined that the CAC needs to be performed, proceeding to step 611, the BS performs the CAC, and assigns the TCIDs to the service flows according to the CAC result. In this case, the TCIDs are assigned only to service flows admitted in the CAC.

In step 615, the BS processes service flows not assigned with the TCIDs according to the QoS policy of the MS. Specifically, the service flow denied in the CAC may be managed in a provisioned state, or the network re-entry process (i.e., the ranging process) may be continuously performed until the service flows are admitted in the CAC. In addition, the service flows may be deleted by not updating a CID, or load balancing may be performed. If a QoS type of the MS is 'dynamic', a service flow not assigned with a TCID may be deleted automatically or by performing a DSD process.

If the network re-entry process is completed, the BS transmits to the MS a ranging response message including "SFID vs. TCID" in step 617. The ranging response message may include CAC result information. If a service flow is managed in the provisioned state, the BS and the MS may manage the service flow in the provisioned state without having to perform an additional process, or may negotiate a transition to the provisioned state by performing the DSC process.

Figure 7:
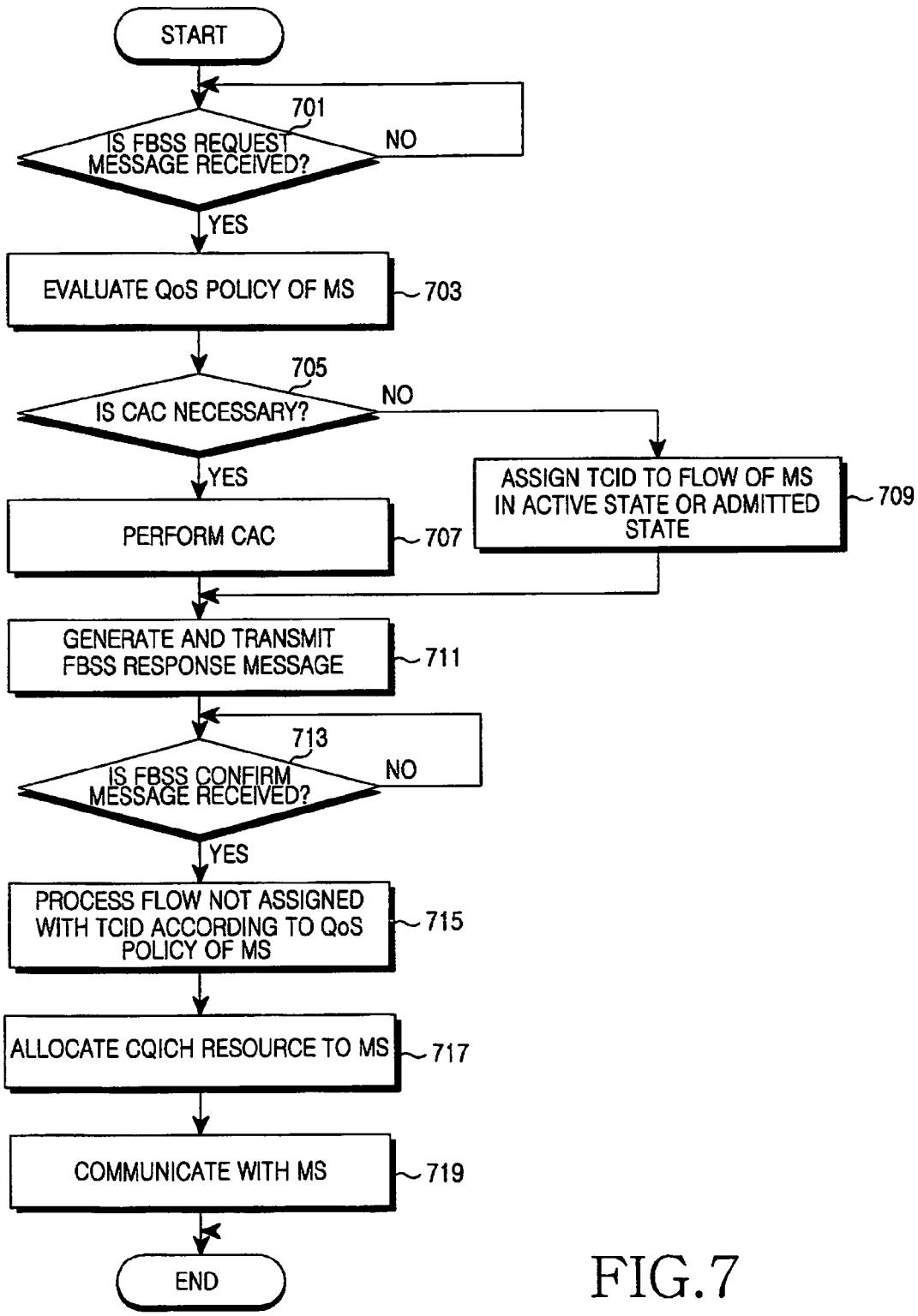
FIG. 7 is a flowchart illustrating an operation of performing an FBSS in a BS on the basis of a QoS policy according to the present invention.

FIG. 7 is a flowchart illustrating an operation of performing an FBSS in a BS on the basis of a QoS policy according to the present invention. In particular, FIG. 7 illustrates an operation a candidate BS when an MS performs the FBSS.

Referring to FIG. 7, in step 701, the BS examines whether a request message which inquires service capability is received from a serving BS. The request message may include per-user QoS information and profile IDs of SFs currently managed by the MS performing the FBSS. The serving BS and the MS update a group (or a diversity set) of candidate BSs, to which the MS can be moved, periodically or in an event triggered manner. In the update process, the serving BS transmits the request message to neighbor BSs.

Upon receiving the request message, in step 703, the BS analyzes the request message and evaluates the QoS policy of the MS. That is, the BS evaluates the QoS policy to be applied to the MS when the FBSS is performed. In step 705, the BS determines if a CAC needs to be performed on the service flows of the MS according to the QoS policy. If it is determined that the CAC does not need to be performed, proceeding to step 709, the BS assigns TCIDs to all service flows in an active state or an admitted state. Otherwise, if it is determined that the CAC needs to be performed, proceeding to step 707, the BS performs the CAC, and assigns the TCIDs to the service flows according to the CAC result. In this case, the TCIDs are assigned only to service flows admitted in the CAC. It will be assumed hereinafter that the CAC is performed.

In step 711, the BS configures a response message including the CAC result and transmits the response message to the serving BS. Then, the serving BS configures a diversity set update request (i.e., BSHO_REQ) message on the basis of the CAC result received from the candidate BSs, and transmits the diversity set update request message to the MS. Then, the MS updates the diversity set managed by the MS and then transmits a response message to the serving BS. Thereafter, when the FBSS is finally determined, the MS transmits an indication message including information on the target BS, and performs switching to the target BS. Upon receiving the indication message, the serving BS transmits to the target BS a confirm message which informs that the MS has switched to the target BS.

In step 713, the BS examines whether the confirm message has been received from the serving BS. Upon receiving the confirm message, proceeding to step 715, the BS processes the service flows currently not assigned with the TCIDs according to the QoS policy of the MS. Specifically, according to the QoS policy, the service flows not assigned with the TCIDs may be managed in a provisioned state, or the CAC may be continuously performed for a certain period of time by setting a timer. If a QoS type of the MS is 'dynamic', a flow not assigned with a TCID may be deleted automatically or by performing a DSD process.

In step 717, the BS allocates a CQICH resource to the MS, and broadcasts an allocation message (i.e., CQICH_alloc_IE) including the allocated resource information. After allocating the CQICH resource to the MS, the BS performs traffic communication with the MS in step 719.

If a service flow is managed in the provisioned state, the BS and the MS may manage the service flow in the provisioned state without having to perform an additional process, or may negotiate a transition to the provisioned state by performing a DSC process.

Figure 8:
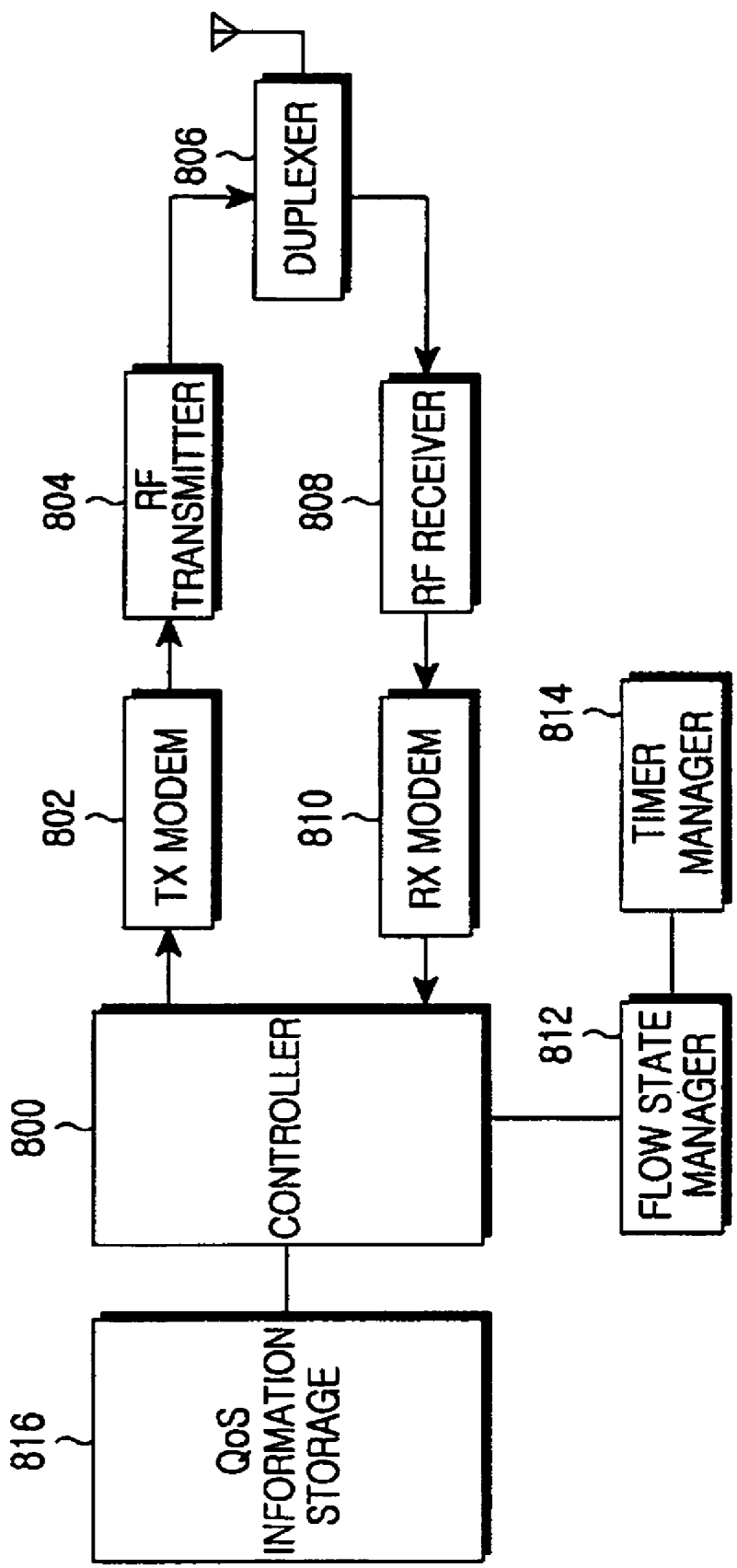
FIG. 8 is a block diagram illustrating a structure of a BS in a broadband wireless access (BWA) system according to the present invention.

FIG. 8 is a block diagram illustrating a structure of a BS in a BWA system according to the present invention.

Referring to FIG. 8, the BS includes a controller 800, a transmit (Tx) modem 802, a radio frequency (RF) transmitter 804, a duplexer 806, an RF receiver 808, a receive (Rx) modem 810, a flow state manager 812, a timer manager 814, and a QoS information storage 816.

The Tx modem 802 includes a channel coding block and a modulation block. The Tx modem 802 modulates a message (or a packet) received from the controller 800. The channel coding block may include a channel encoder, an interleaver, and a modulator. The modulation block may include an inverse fast Fourier transform (IFFT) operator for carrying Tx data on a plurality of orthogonal sub-carriers. The structure above is for an orthogonal frequency division multiplexing (OFDM) system. When a code division multiple access (CDMA) is used, the IFFT operator may be replaced with a code spreading modulator.

The RF transmitter 804 includes a frequency converter and an amplifier. The RF transmitter 804 converts the baseband signal received from the Tx modem 802 into an RF signal. The duplexer 806 transmits a Tx signal received from the RF transmitter 804 through an antenna according to a duplexing scheme, and provides an Rx signal received through an antenna to the RF receiver 808. The RF receiver 808 includes an amplifier and a frequency converter. The RF receiver 808 converts the RF signal received through the antenna into a baseband signal.

The Rx modem 810 includes a demodulation block and a channel decoding block. The Rx modem 810 demodulates a signal received from the RF receiver 808. The demodulation block may include an FFT operator for extracting data carried on each sub-carrier. The channel decoding block may include a demodulator, a de-interleaver, and a channel decoder.

The QoS information storage 816 receives QoS policy information of an MS from a policy server or an NE (e.g., an AAA server including a PDF) of another network and manages the received QoS policy information. Further, the QoS information storage 816 receives QoS information of an MS performing an HHO or FBSS from a previous serving ASN, and manages the received QoS information. For example, the QoS policy information may include per-flow QoS profile information (or a QoS parameter set) and per-user QoS information.

The flow state manager 812 manages an operation mode (e.g., an awake mode, a sleep mode, and an idle mode) for each MS and a state (e.g., an active state, an admitted state, and a provisioned state) for each SF. The state for each SF is managed according to a predetermined QoS policy. The timer manager 814 operates a timer used for a mode transition for each MS and a timer used for a state transition for each SF. That is, the timer manager 814 runs a corresponding timer under the control of the flow state manager 812, and when the timer has expired, the timer manager 814 reports the timer expiration to the flow state manager 812. Then, the flow state manager 812 performs a state transition process according to the timer expiration.

The controller 800 processes and controls overall operations for a QOS service. According to the present invention, the controller 800 processes a QCS, HHO, and FBSS according to the QoS policy. If the QCS is detected, the controller 800 evaluates the QoS policy of a corresponding MS and determines whether to restore the SF of the MS to the previous state according to the QoS policy. If the SF is not restored to the previous state, the controller 800 transitions the SF of the MS to the provisioned state. Otherwise, if the SF is restored, the controller 800 performs a CAC, and restores the flows to the previous state according to the CAC result.

If the MS performing a handover is detected from a neighbor BS, the controller 800 evaluates the QoS policy of the MS, and determines if the CAC needs to be performed on the MS according to the QoS policy. If it is determined not to perform the CAC, the controller 800 assigns TCIDs to the flows of the MS in the active or admitted state. Otherwise, if it is determined to perform the CAC, the controller 800 performs the CAC, and assigns the TCIDs according to the CAC result.

In addition, if the MS included in the coverage of the neighbor BS performs the FBSS, the controller 800 may pre-assign a TCID to the MS. In this case, the controller 800 determines if the CAC needs to be performed on the MS according to the QoS policy of the MS. If it is determined not to perform the CAC, the controller 800 assigns TCIDs to flows of the MS in the active or admitted state. Otherwise, if it is determined to perform the CAC, the controller 800 performs the CAC, and assigns the TCIDs according to the CAC result.

As described above, the present invention provides a method of processing the QCS, HHO, and FBSS for QoS SFs which are not currently standardized. According to the present invention, the CAC is performed in a BS according to a QoS policy when the QCS, HHO, and FBSS are performed. Therefore, a call disconnection and a waste of radio resources can be avoided, and erroneous operations can be prevented when a per-flow state is different between the BS and an MS. In addition, according to the present invention, a conventional call processing interface is utilized without alteration, and information transmitted through each interface is minimized. Therefore, an overall transmission delay for QoS call processing can be reduced, and processing capacity can be increased.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a base station in a wireless communication system, the method comprising:
    receiving a quality of service (QoS) policy information of mobile stations from a network entity including a policy decision function or from a neighbor base station, and storing the QoS policy information;
    detecting a mobile station attempting connection re-establishment;
    upon detecting the mobile station attempting connection re-establishment, evaluating a QoS policy of the mobile station; and
    controlling a state of a service flow generated for the mobile station according to the QoS policy, the controlling comprising:
        if the mobile station is a mobile station performing a quick connection setup, examining whether the service flow of the mobile station is restored to a previous state;
        if the service flow is not restored to the previous state, transitioning all service flows of the mobile station to a provisioned state; and
        if the service flow is restored to the previous state, performing a connection admission control on the mobile station and transitioning a service flow admitted in the connection admission control to an active state or an admitted state.

2. The method of claim 1, wherein the network entity including the policy decision function is a policy server or an authentication/authorization/accounting (AAA) server.

3. The method of claim 1, wherein the mobile station attempting connection re-establishment is one of a mobile station performing a quick connection setup, a mobile station performing a handover, and a mobile station performing a fast base station switching.

4. The method of claim 1, further comprising processing a service flow denied in the connection admission control according to the QoS policy of the mobile station.

5. The method of claim 4, wherein processing a service flow denied in the connection admission control according to the QoS policy of the mobile station comprises:
    if the QoS policy is a first policy, transitioning the service flow denied in the connection admission control to the provisioned state;
    if the QoS policy is a second policy, treating the quick connection setup as a failure;
    if the QoS policy is a third policy, performing the connection admission control until all service flows are restored to the previous state; and
    if the QoS policy is a fourth policy, performing load balancing.

6. The method of claim 1, further comprising transmitting to the mobile station a message including a traffic connection identifier assigned to the service flow admitted in the connection admission control.

7. The method of claim 1, wherein the QoS policy information of the mobile stations, which is received from the neighbor base station, is one of a parameter which indicates whether to perform a connection admission control and a parameter which indicates a manner of treating the service flow denied in the connection admission control.

8. A method of operating a base station in a wireless communication system, the method comprising:
    receiving a quality of service (QoS) policy information of mobile stations from a network entity including a policy decision function or from a neighbor base station, and storing the QoS policy information;
    detecting a mobile station attempting connection re-establishment;
    upon detecting the mobile station attempting connection re-establishment, evaluating a QoS policy of the mobile station; and
    controlling a state of a service flow generated for the mobile station according to the QoS policy, wherein the controlling comprises:
        if the mobile station is a mobile station performing a handover, examining whether the connection admission control is performed on the mobile station;
        if the connection admission control is not performed, assigning a traffic connection identifier to a flow of the mobile station in an active state or an admitted state; and
        if the connection admission control is performed, performing the connection admission control on the mobile station and assigning the traffic connection identifier to the service flow admitted in the connection admission control.

9. The method of claim 8, further comprising processing the service flow denied in the connection admission control according to the QoS policy of the mobile station.

10. The method of claim 9, wherein processing the service flow denied in the connection admission control according to the QoS policy of the mobile station comprises:
    if the QoS policy is a first policy, transitioning the service flow denied in the connection admission control to a provisioned state;
    if the QoS policy is a second policy, performing a network re-entry process continuously until the service flow is admitted in the connection admission control;
    if the QoS policy is a third policy, deleting the service flow denied in the connection admission control; and
    if the QoS policy is a fourth policy, performing load balancing.

11. The method of claim 8, further comprising transmitting to the mobile station a message including a traffic connection identifier assigned to the service flow admitted in the connection admission control.

12. A method of operating a base station in a wireless communication system, the method comprising:
    receiving a quality of service (QoS) policy information of mobile stations from a network entity including a policy decision function or from a neighbor base station, and
storing the QoS policy information;
detecting a mobile station attempting connection re-establishment;
upon detecting the mobile station attempting connection re-establishment, evaluating a QoS policy of the mobile station; and
controlling a state of a service flow generated for the mobile station according to the QoS policy, wherein the controlling comprises:
  if the mobile station is the mobile station performing a fast base station switching, evaluating the QoS policy for a service flow not assigned with a traffic connection identifier;
  if the QoS policy is a first policy, transitioning the service flow not assigned with the traffic connection identifier to a provisioned state; and
  if the QoS policy is a second policy, deleting the service flow not assigned with the traffic connection identifier.

13. The method of claim 12, further comprising:
if the QoS policy information of a mobile station performing a fast base station switching is received from the neighbor base station, assigning a traffic connection identifier to a service flow of the mobile station according to the QoS policy; and
transmitting to the neighbor base station the message including the assigned traffic connection identifier.

14. The method of claim 13, wherein assigning a traffic connection identifier to a service flow of the mobile station according to the QoS policy comprises:
examining whether the connection admission control is performed on the mobile station;
if the connection admission control is not performed, assigning the traffic connection identifier to the service flow of the mobile station in an active state or an admitted state; and
if the connection admission control is performed, performing the connection admission control on the mobile station and assigning the traffic connection identifier to the service flow admitted in the connection admission control.

15. The method of claim 13, further comprising, upon receiving a confirm message which informs that the mobile station has switched to the base station, allocating a channel quality channel (CQICH) resource to the mobile station and broadcasting a CQICH allocation message.

16. The method of claim 12, further comprising, if a new service flow is generated for a mobile station currently performing a fast base station switching, transmitting to the mobile station a diversity set update request message including a service flow identifier and a traffic connection identifier assigned to the mobile station.

17. The method of claim 16, wherein the diversity set update request message is a base station handover request (BSHO_REQ) message or a base station handover response (BSHO_RSP) message.

18. A base station (BS) apparatus in a wireless communication system, the apparatus comprising:
a storage configured to receive a quality of service (QoS) policy information of mobile stations from a network entity including a policy decision function or from a neighbor base station, and store the QoS policy information; and
a controller configured to:
detect a mobile station attempting connection re-establishment,
upon detection of the mobile station attempting connection re-establishment, evaluate a QoS policy of the mobile station, and
control a state of a service flow generated for the mobile station according to the QoS policy, wherein, to control the state of the service flow, the controller is configured to:
  if the mobile station is a mobile station performing a quick connection setup, examine whether the service flow of the mobile station is restored to a previous state;
  if the service flow is not restored to the previous state, transition all service flows of the mobile station to a provisioned state; and
  if the service flow is restored to the previous state, perform a connection admission control on the mobile station and transition a service flow admitted in the connection admission control to an active state or an admitted state.

19. The apparatus of claim 18, wherein the network entity including the policy decision function is a policy server or an authentication/authorization/accounting (AAA) server.

20. The apparatus of claim 18, wherein the mobile station attempting connection re-establishment is one of a mobile station performing a quick connection setup, a mobile station performing a handover, and a mobile station performing a fast base station switching.

21. The apparatus of claim 18, wherein the controller processes a service flow denied in the connection admission control according to the QoS policy of the mobile station.

22. The apparatus of claim 21, wherein the controller, to process a service flow denied in the connection admission control according to the QoS policy of the mobile station,
if the QoS policy is a first policy, transitions the service flow denied in the connection admission control to the provisioned state;
if the QoS policy is a second policy, treating the quick connection setup as a failure;
if the QoS policy is a third policy, performs the connection admission control until all service flows are restored to the previous state; and
if the QoS policy is a fourth policy, performs load balancing.

23. The apparatus of claim 18, wherein the controller transmits to the mobile station a message including a traffic connection identifier assigned to the service flow admitted in the connection admission control.

24. The apparatus of claim 18, wherein the QoS policy information of the mobile stations, which is received from the neighbor base station, is one of a parameter which indicates whether to perform a connection admission control and a parameter which indicates a manner of treating the service flow denied in the connection admission control.

25. A base station (BS) apparatus in a wireless communication system, the apparatus comprising:
a storage configured to receive a quality of service (QoS) policy information of mobile stations from a network entity including a policy decision function or from a neighbor base station, and store the QoS policy information; and
a controller configured to:
detect a mobile station attempting connection re-establishment,
upon detection of the mobile station attempting connection re-establishment, evaluate a QoS policy of the mobile station, and control a state of a service flow generated for the mobile station according to the QoS policy, wherein to control the state of the service flow, the controller is configured to:
- if the mobile station is a mobile station performing a handover, examine whether the connection admission control is performed on the mobile station;
- if the connection admission control is not performed, assign a traffic connection identifier to a flow of the mobile station in an active state or an admitted state; and
- if the connection admission control is performed, perform the connection admission control on the mobile station and assign the traffic connection identifier to the service flow admitted in the connection admission control.

26. The apparatus of claim 25, wherein the controller processes the service flow denied in the connection admission control according to the QoS policy of the mobile station.

27. The method of claim 26, wherein the controller, to process the service flow denied in the connection admission control according to the QoS policy of the mobile station,
- if the QoS policy is a first policy, transitions the service flow denied in the connection admission control to a provisioned state;
- if the QoS policy is a second policy, performs a network re-entry process continuously until the service flow is admitted in the connection admission control;
- if the QoS policy is a third policy, deletes the service flow denied in the connection admission control; and
- if the QoS policy is a fourth policy, performing load balancing.

28. The apparatus of claim 25, wherein the controller transmits to the mobile station a message including a traffic connection identifier assigned to the service flow admitted in the connection admission control.

29. A base station (BS) apparatus in a wireless communication system, the apparatus comprising:
- a storage configured to receive a quality of service (QoS) policy information of mobile stations from a network entity including a policy decision function or from a neighbor base station, and store the QoS policy information; and
- a controller configured to:
  - detect a mobile station attempting connection re-establishment,
  - upon detection of the mobile station attempting connection re-establishment, evaluate a QoS policy of the mobile station, and
  - control a state of a service flow generated for the mobile station according to the QoS policy, wherein to control the state of the service flow the controller is configured to:
    - if the mobile station is the mobile station performing a fast base station switching, evaluate the QoS policy for a service flow not assigned with a traffic connection identifier;
    - if the QoS policy is a first policy, transition the service flow not assigned with the traffic connection identifier to a provisioned state; and
    - if the QoS policy is a second policy, delete the service flow not assigned with the traffic connection identifier.

30. The apparatus of claim 29, wherein the controller,
- if the QoS policy information of a mobile station performing a fast base station switching is received from the neighbor base station, assigns a traffic connection identifier to a service flow of the mobile station according to the QoS policy; and
- transmits to the neighbor base station the message including the assigned traffic connection identifier.

31. The apparatus of claim 30, wherein the controller, to assign a traffic connection identifier to a service flow of the mobile station according to the QoS policy,
- examines whether the connection admission control is performed on the mobile station;
- if the connection admission control is not performed, assigns the traffic connection identifier to the service flow of the mobile station in an active state or an admitted state; and
- if the connection admission control is performed, performs the connection admission control on the mobile station and assigns the traffic connection identifier to the service flow admitted in the connection admission control.

32. The apparatus of claim 30, wherein the controller, upon receiving a confirm message which informs that the mobile station has switched to the base station, allocates a channel quality channel (CQICH) resource to the mobile station and broadcasting a CQICH allocation message.

33. The apparatus of claim 29, wherein the controller, if a new service flow is generated for a mobile station currently performing a fast base station switching, transmits to the mobile station a diversity set update request message including a service flow identifier and a traffic connection identifier assigned to the mobile station.

34. The apparatus of claim 33, wherein the diversity set update request message is a base station handover request (BSHO_REQ) message or a base station handover response (BSHO_RSP) message.

* * * * *